United States Patent [19]

Jones

[11] Patent Number: 4,997,458

[45] Date of Patent: Mar. 5, 1991

[54] TILT VALVE CARBURETOR FOR GASEOUS FUEL SYSTEMS

[75] Inventor: James S. Jones, Richardson, Tex.

[73] Assignee: David S. Ward, Dallas, Tex. ; a part interest

[21] Appl. No.: 474,487

[22] Filed: Feb. 2, 1990

[51] Int. Cl.⁵ ............................................. F02M 21/02
[52] U.S. Cl. ................................ 48/180.1; 123/527; 137/607
[58] Field of Search ............... 48/180.1, 144; 123/527; 137/607; 201/298, 339

[56] References Cited

U.S. PATENT DOCUMENTS

| 562,410 | 6/1896 | Moor | 48/180.1 |
|---|---|---|---|
| 913,121 | 2/1909 | Frayer | 48/180.1 |
| 2,919,885 | 1/1960 | Daigle | 251/298 |
| 2,957,759 | 10/1960 | Jettinglh off | 48/180.1 |
| 3,623,696 | 11/1971 | Baumanrs | 201/298 |
| 4,193,578 | 3/1980 | Brumm | 201/298 |
| 4,285,700 | 8/1981 | Fox | 48/180.1 |
| 4,894,067 | 1/1990 | Bayerstock | 48/180.1 |

OTHER PUBLICATIONS

OHG X-100 Series Carburetor by Nolff's Carburetion, Inc. (no date).

Primary Examiner—Peter Kratz
Attorney, Agent, or Firm—Daniel V. Thompson

[57] ABSTRACT

An air/gaseous fuel proportioning device includes an air inlet, a fuel inlet, an outlet to feed an air fuel blend to an engine, with the air inlet having an air butterfly valve to throttle the air flow, having a disc-shaped fuel valve resting in a conical bore and having a linkage attached to the air butterfly valve for causing the fuel valve to follow the air butterfly valve in a tilting motion to provide an open area between the disc and cone that relates proportionally to the air flow past the air butterfly valve.

4 Claims, 2 Drawing Sheets

TILT VALVE CARBURETOR FOR GASEOUS FUEL SYSTEMS

TECHNICAL FIELD

This invention relates to gaseous fuel systems for internal combustion engines.

BACKGROUND OF THE INVENTION

Gaseous fuels, such as propane or LP gas, are often used for internal combustion engines in applications such as fork lifts or generators. The advantages in such applications of gaseous fuels over liquid fuels such as gasoline or diesel are well known.

The greatest portion of gaseous engine fuel consumed by industrial users is at engine loads from 20% to 80%. An excess amount of fuel, known as "dirty burn", typically occurs below 20% load at slow speeds. Many of the existing gaseous fuel systems use very light pressure differences to meter fuel at idle and light loads and are adversely affected by fuel contamination (oils that are suspended in the fuel). These systems seem to perform better under rich combustion conditions, which sacrifices to some degree efficiency and the clean burn ability of gaseous fuels.

Thus, there presently exists a need for a gaseous fuel carburetor that provides clean burning and high efficiency under the entire range of engine loads and speeds.

SUMMARY OF THE INVENTION

The present invention provides an air/gaseous fuel proportioning device that receives the air and fuel at the same pressure base and throttles both the air and fuel into a common chamber having a lower pressure to provide an air fuel charge to an internal combustion engine. An air valve and fuel valve open and close in unison to use the maximum available pressure difference across the fuel metering valve at idle and light loads with the predominant fuel control being the open area between a tilt valve and a cone that supports it. This control system has a predetermined mid range air/fuel ratio that is affected very little with either the idle or load trim. A tilt valve disc in the fuel valve passes both the inner and outer face of a support cone at maximum throttle opening. This increased valve area produces a rich air/fuel ratio which can be trimmed to the proper ratio with the use of an orifice or a trim screw working in series with the tilt valve.

The tilt valve is so positioned to be lean at the idle mode so a simple idle trim is required. The fuel quantity across the idle trim is maximum and constant at manifold vacuums greater than ½ the barometer, and its effect diminishes rather rapidly as the fuel demand increases.

BRIEF DESCRIPTION OF THE DRAWINGS

A more complete understanding of the invention and its advantages will be apparent from the detailed description taken in conjunction with the accompanying drawings in which.

DETAILED DESCRIPTION OF THE PREFERRED EMBODIMENT

Figure 1:
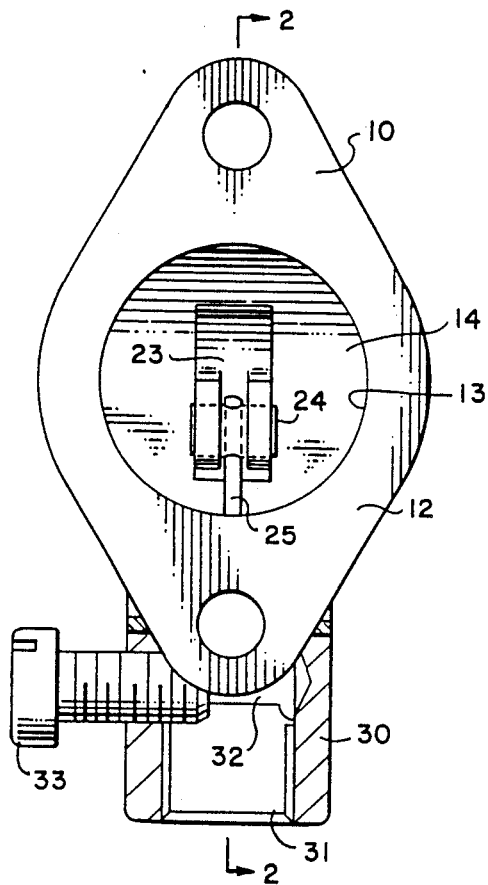
FIG. 1 is a partially broken away end view of a side draft carburetor constructed in accordance with the invention.
Figure 2:
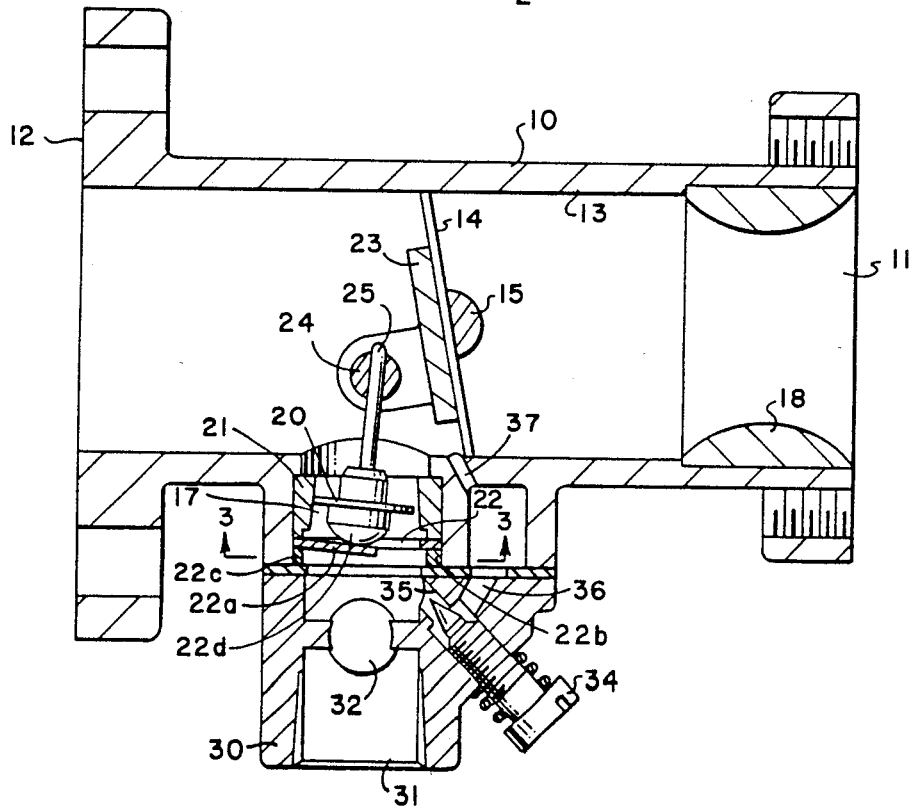
FIG. 2 is a sectional view taken along lines 2—2 of FIG. 1.

Referring initially to FIGS. 1, 2, 3A and 3B a side draft carburetor having body 10 is sized for engines ranging in size from 6 cubic inch one-cylinder designs to four-cylinder engines of 65 cubic inches. Flanged air inlet 11 and the throttle flange 12 of are located at opposite ends of body 10. Bore 13 through body 10 has a simple throttle butterfly valve 14 that is mounted on throttle shaft 15. Body 10 provides a fuel cavity 17 which houses cone 21 and tilt valve 20, which is held in place with retainer 22. Retainer 22 includes a spring tang 22a extending inwardly from a peripheral ring 22b trapped between cone 21 and a spacer 22c. Spring tang 22a lightly biases tilt valve 20 into cone 21 by way of curved button 22d fixed to tilt valve 20. Yoke 23 is mounted to butterfly 14 and pivotally carries swivel 24 through which tilt valve stem 25 is slidably engaged. Tilt valve stem 25 is fixed to tilt valve 20 opposite to curved button 22d. Fuel control housing 30 covers fuel cavity 17 and has a fuel inlet 31 with load trim opening 32 formed by trim screw 33 and housing 30. An idle trim is provided by trim screw 34 and idle trim orifice 35.

Figure 3A:
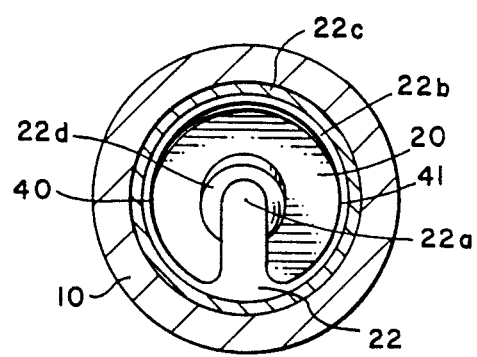
FIGS. 3A and 3B are sectional views taken along lines 3—3 of FIG. 2.

In operation, during the idle mode as shown in FIG. 3A the air butterfly valve 14 is in a fixed position with bore 13 to provide the proper idle air. Fuel valve 20 is also in a fixed position with the tapered, frustroconical bore of cone 21 providing idle fuel through the relatively small open area between valve 20 and cone 21. By design, this idle fuel does not meet the engine's requirements, so additional fuel is moved from the area between load screw 33 and tilt valve 20 through passage 35 across idle trim screw 34 through passages 36 and 37 into bore 13 between the air butterfly valve 13 and the engine's manifold.

Figure 3B:
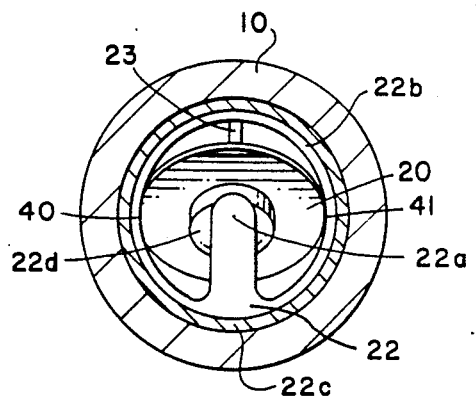

FIG. 3B illustrates tilt valve 20 at the maximum power position. The maximum power trim is provided by the position of load trim screw 33 to the fuel control housing 30 to provide open area 32. The effect of fuel flow across area 32 and the area across tilt valve 20 can be expressed as the resistance of tilt valve 20 at any position divided by the square root of the resistance of tilt valve 20 squared plus the resistance of orifice 32 squared. From this expression it is obvious that tilt valve 20 is the predominant control factor even with lean maximum power settings, and it becomes apparent that one of the main functions of the power trim is to provide means to compensate for the resistance of the fuel supply means from the regulator to the carburetor at maximum power.

The predominance of tilt valve 20 over the fuel flow during the engine's load range where the majority of the fuel is consumed and the simple construction of tilt valve 20 provides the manufacturer an opportunity to provide a tamper-proof system in the mid-load range and still provide the flexibility to control the idle and maximum power modes.

Tilt valve 20 is preferably a circular disc formed of hardened steel resting in the frustroconical bore of the hardened cone 21 and is tilted to provide an open area between the disc and the cone very much like the butterfly used as the air valve. The valve stem 25 never parallels the center line of cone 21, such that two variable contact points 40 and 41 (FIGS. 3A and 3B) between the disc and cone are provided on opposite sides of the disc 20. The contact load between the disc and cone at points 40 and 41 is quite high per square inch at the idle and light load modes, but the contact velocity is very, very low and should provide a long operating life. The low mechanical friction of the air and fuel valves and the lack of valve movement in or out of the cone makes the system very compatible with the sensitive governors found on the small one and two cylinder engines.

The side draft carburetor shown in FIGS. 1, 2, 3A and 3B is well suited for small one cylinder engines. A ⅛" SAE side draft carburetor utilizing the invention is suitable for use on engines having displacements from 6 to 30 cubic inches. To compensate for the lack of an air signal at full throttle on the small engines a choke tube 18 is installed in bore 13 upstream of the air valve 14. The load trim 33 and choke tube 18 will be the predominant control of the air/fuel ratio at full throttle, but the air valve 14 and tilt valve 20 will dominate at the light to moderate loads.

Figure 4:
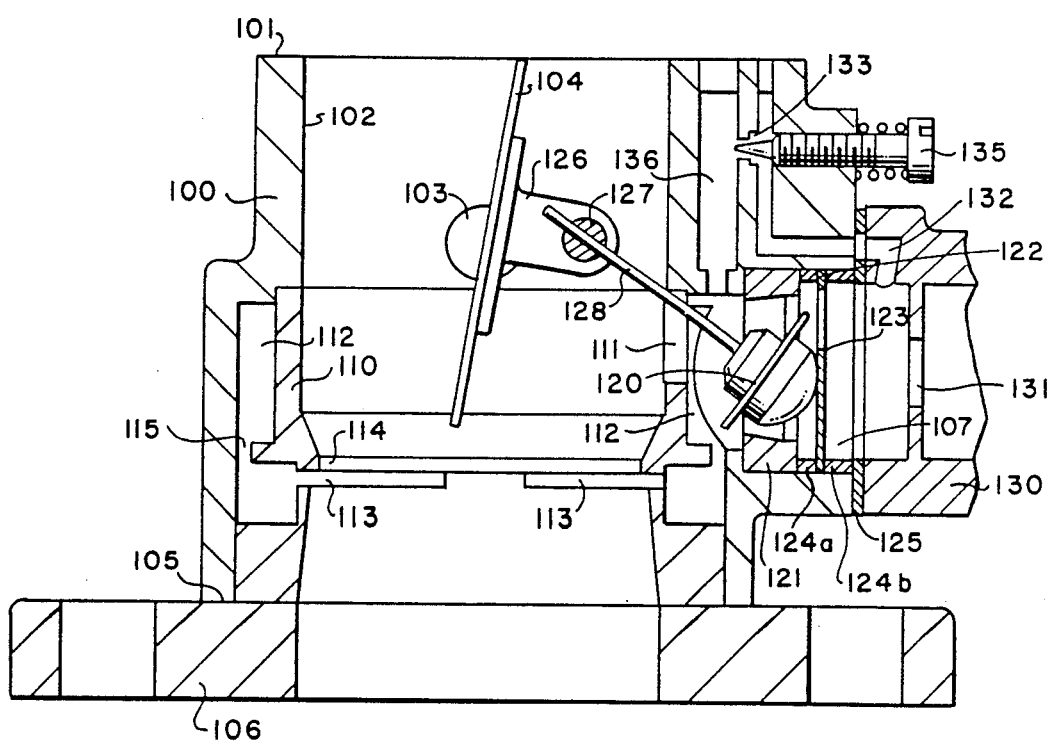
FIG. 4 is a partially broken away side view of a carburetor adapted for use on engines of more than four cylinders.

Referring now to FIG. 4, a tilt valve carburetor adapted for engines having more than four cylinders provides improved fuel distribution over the carburetor described above. Body 100 includes a flange 101 to receive a suitable air intake adaptor. Body 100 has a bore 102 having throttle shaft 103 to which air butterfly valve 104 is attached. Bore 102 is enlarged downstream from the butterfly 104 to receive venturi 110. Body 100 has a flange 105 that receives intake manifold adaptor 106 which retains venturi 110.

Body 100 has a cavity 107 which houses fuel tilt valve 120, cone 121, and a valve retainer 122. Valve retainer 122 has a flexible leaf spring member 123 that slightly preloads valve 120 into cone 121. Retainer 122 is secured between spacers 124a, 124b and 125 and fuel inlet 130. Fuel inlet 130 provides maximum power trim orifice 131 as well as the idle fuel passage 132 that feeds fuel to orifice 133 which is throttled by trim screw 135. The fuel enters passage 136 on its way to chamber 112 where it joins the metered fuel from the tilt fuel valve 120.

Yoke 126 is mounted on butterfly 104 and pivotally carries swivel 127 through which tilt valve shaft 128 slidably rides to properly position the tilt valve 120 in relation to the air butterfly valve 104. Venturi 110 has a slit 111 to allow free movement of valve shaft 128. A fuel cavity 112 is formed by the upper portion of venturi 110 and body 100 which feeds the large fuel slot 113 that is just downstream of venturi throat 114.

In operation, the air butterfly valve 104 is positioned to supply the air for the given engine mode, and the position of the air valve 104 positions the fuel valve 120 to supply the proper fuel by way of the linkage formed by yoke 126, swivel 127, valve shaft 128 and two variable point contacts between tilt valve 120 and cone 121. As the air moves across the venturi, there is a pressure drop across the throat due to the increased velocity. This pressure difference moves air from the bore 102 into the fuel feed chamber 112 through slit 111 which blends with the fuel moving across valve 120 and the idle air and fuel across main idle orifice 136 and is then moved into the main air stream across feed slot 113 through spreader slot 115 formed by ring 116 and body 100.

I claim:

1. A carburetor for gaseous fuels comprising a fuel tilt valve actuated by way of a linkage to an air valve, said air valve is located within a body of the carburetor, wherein the tilt valve is located in a fuel passageway communicating with the carburetor body, the tilt value including a disc pivotally supported at two approximately opposite, variable contact points along the periphery thereof by a frustroconical surface to meter fuel, and means for maintaining contact between the disc and the frustoconical surface.

2. The carburetor of claim 1 wherein the disc is biased in the direction of the frustroconical surface by a spring member.

3. The carburetor of claim 2 wherein the spring member is a flexible leaf extending inwardly from a ring shaped retainer.

4. An air/gaseous fuel proportioning device comprising an air inlet passageway, a fuel inlet passageway, an outlet passageway to feed an air/fuel blend to an engine, with the air inlet having an air butterfly valve to throttle the air flow, the fuel inlet passageway having a disc-shaped fuel valve resting in a cone including a conical bore, means for maintaining contact between the disc-shaped fuel valve and the conical bore, and to the fuel valve for causing the fuel valve to follow the air butterfly valve in a tilting motion to provide an open area between the disc and cone that relates proportionally to the air flow past the air butterfly valve.

* * * * *

UNITED STATES PATENT AND TRADEMARK OFFICE
CERTIFICATE OF CORRECTION

PATENT NO. : 4,997,458

DATED : March 5, 1991

INVENTOR(S) : James S. Jones

It is certified that error appears in the above-identified patent and that said Letters Patent is hereby corrected as shown below:

Column 4, line 44 after "bore" insert -- and having linkage means attached to the air butterfly valve --.

Signed and Sealed this

Seventh Day of December, 1993

Attest:

BRUCE LEHMAN

Attesting Officer

Commissioner of Patents and Trademarks